United States Patent
Bean et al.

(10) Patent No.: US 11,032,266 B2
(45) Date of Patent: Jun. 8, 2021

(54) DETERMINING THE REPUTATION OF A DIGITAL CERTIFICATE

(71) Applicant: McAfee, LLC, Plano, TX (US)

(72) Inventors: James Bean, Portland, OR (US); Joel R. Spurlock, Portland, OR (US); Cedric Cochin, Portland, OR (US); Aditya Kapoor, Portland, OR (US); Ramnath Venugopalan, Webster, NY (US)

(73) Assignee: McAfee, LLC, San Jose, CA (US)

( * ) Notice: Subject to any disclaimer, the term of this patent is extended or adjusted under 35 U.S.C. 154(b) by 534 days.

(21) Appl. No.: 14/581,651

(22) Filed: Dec. 23, 2014

(65) Prior Publication Data

US 2016/0182492 A1 Jun. 23, 2016

(51) Int. Cl.
*H04L 29/06* (2006.01)

(52) U.S. Cl.
CPC ...... *H04L 63/0823* (2013.01); *H04L 63/0853* (2013.01); *H04L 63/101* (2013.01); *H04L 63/126* (2013.01)

(58) Field of Classification Search
CPC ............. H04L 63/0823; H04L 63/0853; H04L 63/101
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,739,494 B1 * | 6/2010 | McCorkendale | ... H04L 63/0823 713/152 |
| 8,631,244 B1 | 1/2014 | Potts et al. | |
| 8,732,472 B2 * | 5/2014 | Grebennikov | ........ H04L 9/3268 713/175 |
| 2006/0015722 A1 * | 1/2006 | Rowan | ................ H04L 63/0823 713/166 |
| 2007/0180225 A1 * | 8/2007 | Schmidt | ................ H04L 9/3263 713/152 |
| 2008/0028443 A1 | 1/2008 | Adelman et al. | |
| 2012/0096516 A1 | 4/2012 | Sobel et al. | |
| 2012/0226761 A1 | 9/2012 | Emigh et al. | |

(Continued)

FOREIGN PATENT DOCUMENTS

| | | |
|---|---|---|
| WO | WO 2014-143000 A1 | 9/2014 |
| WO | WO 2016/105854 A1 | 6/2016 |

OTHER PUBLICATIONS

Machine Translation of Non-Patent Literature provided on Mar. 26, 2021 by Applicant—The State Intellectual Property Office of People's Republic of China, Dec. 2, 2020 (Year: 2020).*

(Continued)

*Primary Examiner* — Ellen Tran (74) *Attorney, Agent, or Firm* — Patent Capital Group (57) ABSTRACT

Particular embodiments described herein provide for an electronic device that can be configured to identifying a digital certificate associated with data and assigning a reputation to the digital certificate, where the digital certificate is classified as trusted if the digital certificate is included in an entry in a whitelist and the digital certificate is classified as untrusted if the digital certificate is included in an entry in a blacklist.

19 Claims, 8 Drawing Sheets

(56) References Cited

U.S. PATENT DOCUMENTS

2013/0125222 A1* 5/2013 Pravetz .................. H04L 67/22
                                                    726/6
2014/0095866 A1* 4/2014 Grebennikov ........ H04L 9/3263
                                                    713/156
2014/0165203 A1* 6/2014 Friedrichs .............. G06F 21/56
                                                    726/24
2014/0359280 A1   12/2014 Saboor et al.

OTHER PUBLICATIONS

International Search Report and Written Opinion in International Application No. PCT/US2015/062822, dated Feb. 29, 2016, 10 pages.
International Preliminary Report on Patentability in International Application No. PCT/US2015/062822, dated Jun. 27, 2017, 8 pages.
EPO Jun. 27, 2018 Extended European Search Report and Opinion from European Application Serial No. 15874052.2; 9 pages.
EPO Mar. 5, 2019 Examination Report in counterpart European Patent Application No. 15874052.2; 3 pages.
CN, Feb. 18, 2021, Office Action from Chinese Application 201580076695.4; No English translation.

\* cited by examiner

DETERMINING THE REPUTATION OF A DIGITAL CERTIFICATE

TECHNICAL FIELD

This disclosure relates in general to the field of information security, and more particularly, to determining the reputation of a digital certificate.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
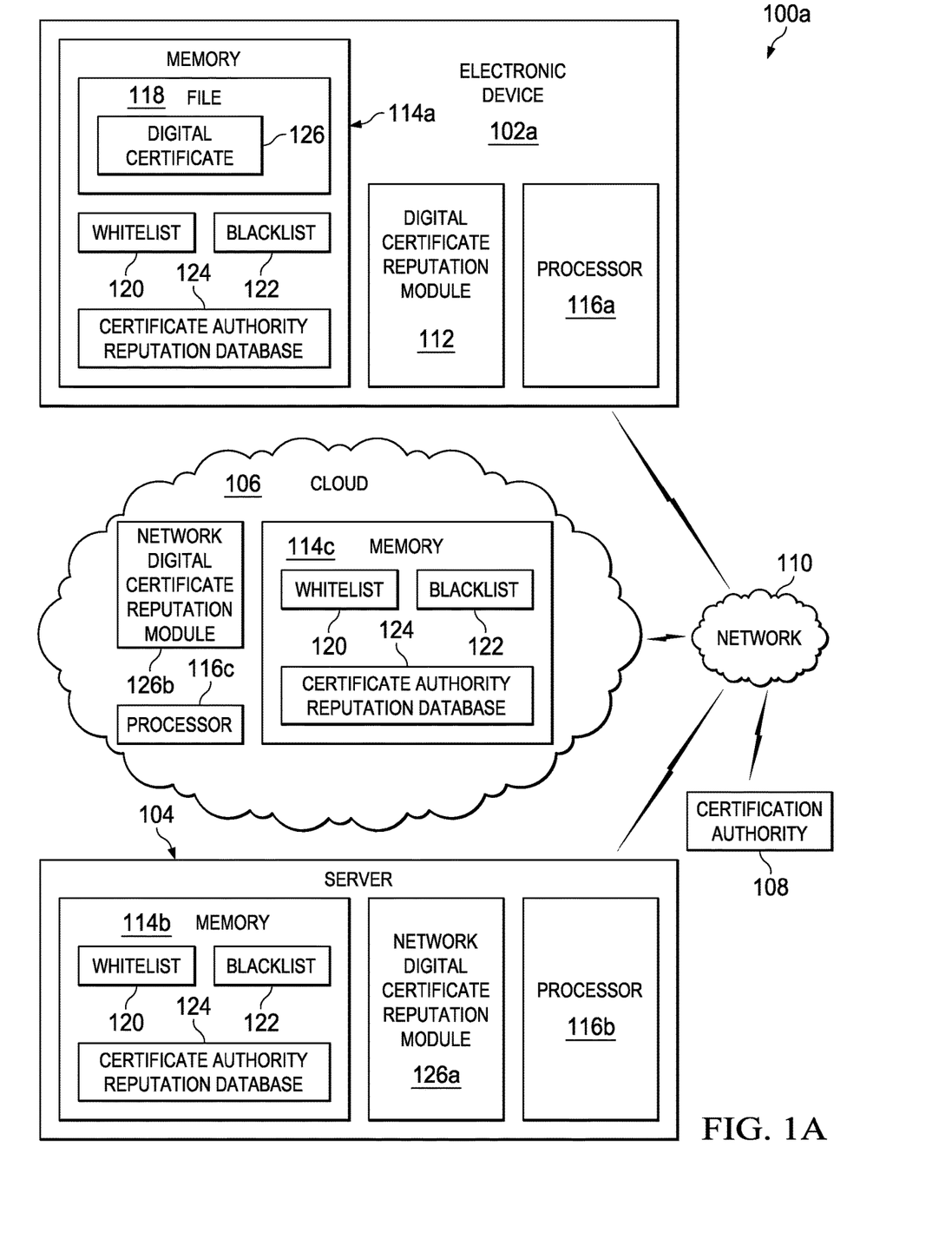
FIG. 1A is a simplified block diagram of a communication system for determining the reputation of a digital certificate in accordance with an embodiment of the present disclosure.

FIG. 1A is a simplified block diagram of a communication system 100a for determination the reputation of a digital certificate in accordance with an embodiment of the present disclosure. As illustrated in FIG. 1A, an embodiment of communication system 100a can include electronic device 102a, a server 104, a cloud 106, and a certificate authority 108. Electronic device 102a can include a digital certificate reputation module 112, memory 114a, and a processor 116a. Memory 114a can include a file 118 signed with a digital certificate 126, a whitelist 120, a black list 122, and a certificate authority reputation database 124. Server 104 can include memory 114b, a processor 116b, and a network digital certificate reputation module 126a. Memory 114b can include whitelist 120, blacklist 122, and certificate authority reputation database 124. Cloud 106 can include memory 114c, a processor 116c, and a network digital certificate reputation module 126b. Memory 114c can include whitelist 120, blacklist 122, and certificate authority reputation database 124. Electronic device 102a, server 104, cloud 106, and certificate authority 108 may be in communication using network 110.

Figure 1B:
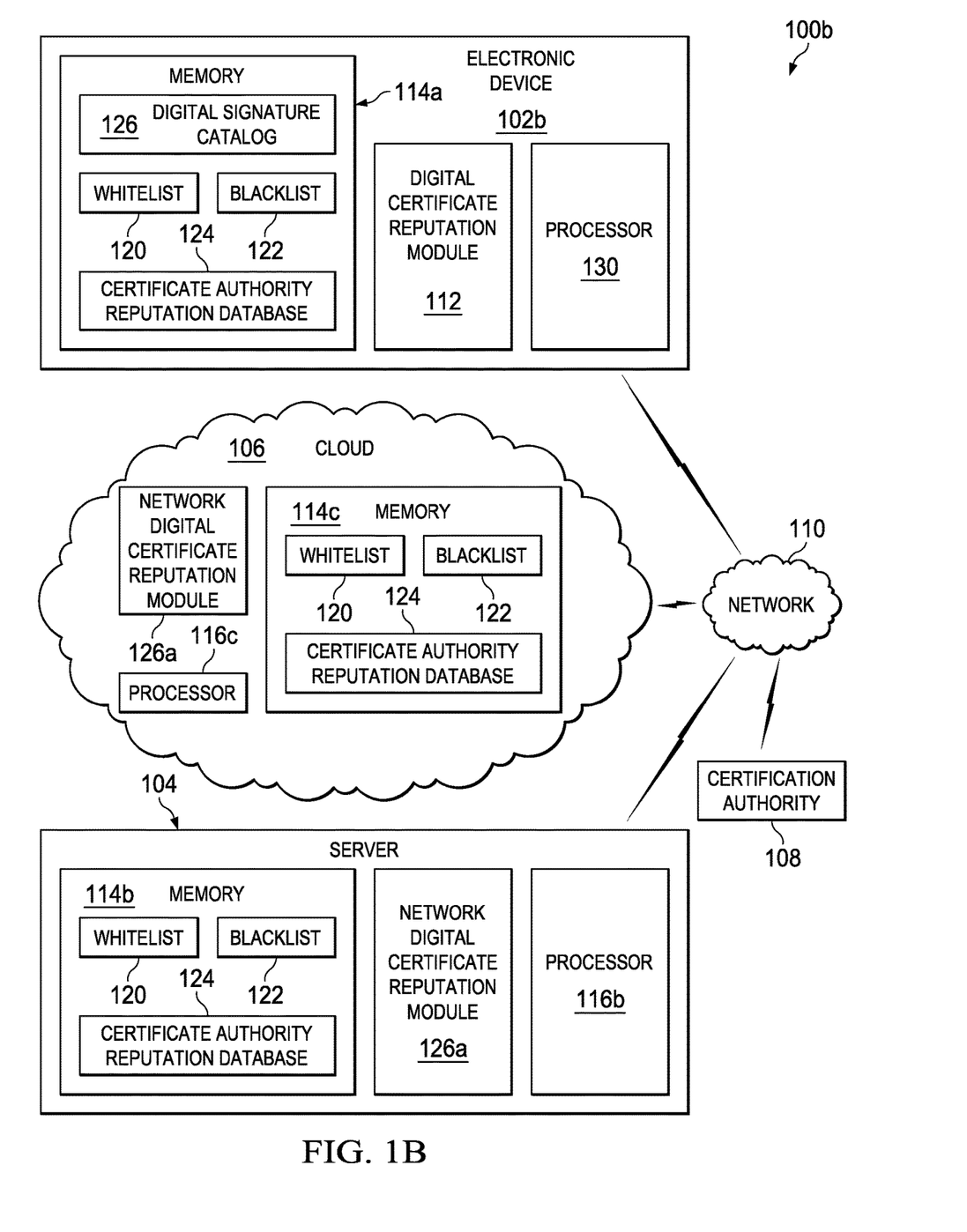
FIG. 1B is a simplified block diagram of a communication system for determining the reputation of a digital certificate in accordance with an embodiment of the present disclosure.

Turning to FIG. 1B, FIG. 1B is a simplified block diagram of a communication system 100b for determining the reputation of a digital certificate in accordance with an embodiment of the present disclosure. As illustrated in FIG. 1B, an embodiment of communication system 100b can include an electronic device 102b, server 104, cloud 106, and certificate authority 108. Memory 114b in electronic device 102b can include whitelist 120, black list 122, certificate authority reputation database 124, and a digital signature catalog 126. Electronic device 102b, server 104, cloud 106, and certificate authority 108 may be in communication using network 110.

In example embodiments, communication system 100a (and 100b) can be configured for determining the reputation of a digital certificate in accordance with an embodiment of the present disclosure. Digital certificate reputation module 112 can be configured to analyze a digital certificate (e.g., digital certificate 126) and determine a reputation for the digital certificate. In another example, digital certificate reputation module 112 can be configured to analyze a digital certificate (e.g., digital certificate 126) and determine if the digital certificate can be classified as trusted or untrusted. For example, digital certificate reputation module 112 can be configured to determine if digital certificate 126 is included in whitelist 120 and if so, classify digital certificate 126 as trusted. In addition, digital certificate reputation module 112 can determine if digital certificate 126 is included in blacklist 122 and if so, classify digital certificate 126 as untrusted. If digital certificate 126 is not included in whitelist 120 or blacklist 122, then digital certificate reputation module 112 can determine the certificate authority for digital certificate 126. For example, the certificate authority for digital certificate 126 may be certificate authority 108. Digital certificate reputation module 112 can be configured to determine if the certificate authority for digital certificate 126 is in whitelist 120 or blacklist 122. If the certificate authority is included in whitelist 120, then digital certificate reputation module 112 can classify digital certificate 126 as trusted. If the certificate authority is included in blacklist 122, then digital certificate reputation module 112 can classify digital certificate 126 as untrusted. If the certificate authority is not included in whitelist or blacklist, then digital certificate reputation module 112 can use certificate authority reputation database 124 and determine a reputation for digital certificate 126. In an embodiment, digital certificate reputation module 112 can use digital signature catalog 126 to lookup a reputation for digital certificate 126. In an example, file 118 may have more than one digital certificate 126 associated with file 118. In such an example, a reputation for each digital certificate may be determined and then the reputations can be combined to create an overall reputation of digital certificate 126.

Elements of FIGS. 1A and 1B may be coupled to one another through one or more interfaces employing any suitable connections (wired or wireless), which provide viable pathways for network (e.g., network 110) communications. Additionally, any one or more of these elements of FIGS. 1A and 1B may be combined or removed from the architecture based on particular configuration needs. Communication systems 100a and 100b may include a configuration capable of transmission control protocol/Internet protocol (TCP/IP) communications for the transmission or reception of packets in a network. Communication systems 100a and 100b may also operate in conjunction with a user datagram protocol/IP (UDP/IP) or any other suitable protocol where appropriate and based on particular needs.

For purposes of illustrating certain example techniques of communication systems 100a and 100b, it is important to understand the communications that may be traversing the network environment. The following foundational information may be viewed as a basis from which the present disclosure may be properly explained.

Currently, certificate authorities (CAs) (e.g., certificate authority 108) have no reputation, configurable reputation, or influence on the reputations of unknown or potentially malicious objects. These objects are typically files and URLs, which are validated by certificates issued by a CA. There are rogue CAs, as well as "self signed" CAs which systems can register to be a trusted. What is needed is a system and method to determine the reputation of a digital certificate.

A communication system for determining the reputation of a digital certificate, as outlined in FIGS. 1A and 1B, can resolve these issues (and others). Communication system 100a and 100b may be configured to create a top level object for CAs in an ecosystem such as a trusted execution environment. The reputation of CAs can be calculated using a variety of algorithms, metadata, and reputation sources. Such a system could allow the ability to track unknown and self signed CAs and to block CAs that are untrusted. A trusted reputation or classification can be assigned to known good CAs and the trusted CAs can be included in a whitelist. An untrusted reputation or classification can be assigned to known untrusted CAs and the untrusted CAs can be included in a blacklist. The remaining CAs may fall under a benign or unknown reputation or classification.

A digital certificate reputation module (e.g., digital certificate reputation module 112) can be configured to use an algorithm that factors GTI reputation, enterprise reputation, external reputation sources, age of the digital certificate or certificate authority, prevalence of the digital certificate or certificate authority, the binary associations to known bad files/sites, etc. to influence an automated reputation determination of the CA. For example, if more than ten percent (>10%) of files rooted to an unknown CA are deemed malicious and the CA has a low file prevalence, then a weighted untrusted reputation may be assigned to the CA. Digital certificates with a known clean reputation would not be influenced by a low CA rating. Digital certificates with unknown, low prevalence, or a high percentage of unknown files would inherit the CA's reputation, or would factor as a weight against the digital certificate.

Turning to the infrastructure of FIG. 1, communication systems 100a and 100b in accordance with an example embodiment is shown. Generally, communication systems 100a and 100b can be implemented in any type or topology of networks. Network 110 represents a series of points or nodes of interconnected communication paths for receiving and transmitting packets of information that propagate through communication systems 100a and 100b. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100a and 100b, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a and 100b. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a and 102b, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a and 100b, electronic devices 102a and 102b, server 104, and cloud 106 can include memory elements (e.g., memory 114a-114c) for storing information to be used in the operations outlined herein. Electronic devices 102a and 102b, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a and 100b, such as electronic devices 102a and 102b, server 104, and cloud 106 may include software modules (e.g., digital certificate reputation module 112 and network digital certificate reputation modules 126a and 126b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 102a and 102b, server 104, and cloud 106 may include a processor (e.g., processor 116a-116c) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a and 102b can each be a network element and include, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication systems 100a and 100b via some network (e.g., network 110). The term 'server' is inclusive of devices used to serve the requests of clients and/or perform some computational task on behalf of clients within communication systems 100a and 100b. Although digital certificate reputation module 112 is represented in FIG. 1A as being located in electronic device 102a and in FIG. 1B as being location in electronic device 102b, this is for illustrative purposes only. Digital certificate reputation module 112 could be combined or separated in any suitable configuration. Furthermore, digital certificate reputation module 112 could be integrated with or distributed in another network accessible by electronic devices 102a and 102b such as server 104 or cloud 106. Cloud 106 is configured to provide cloud services to electronic devices 102a and 102b. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
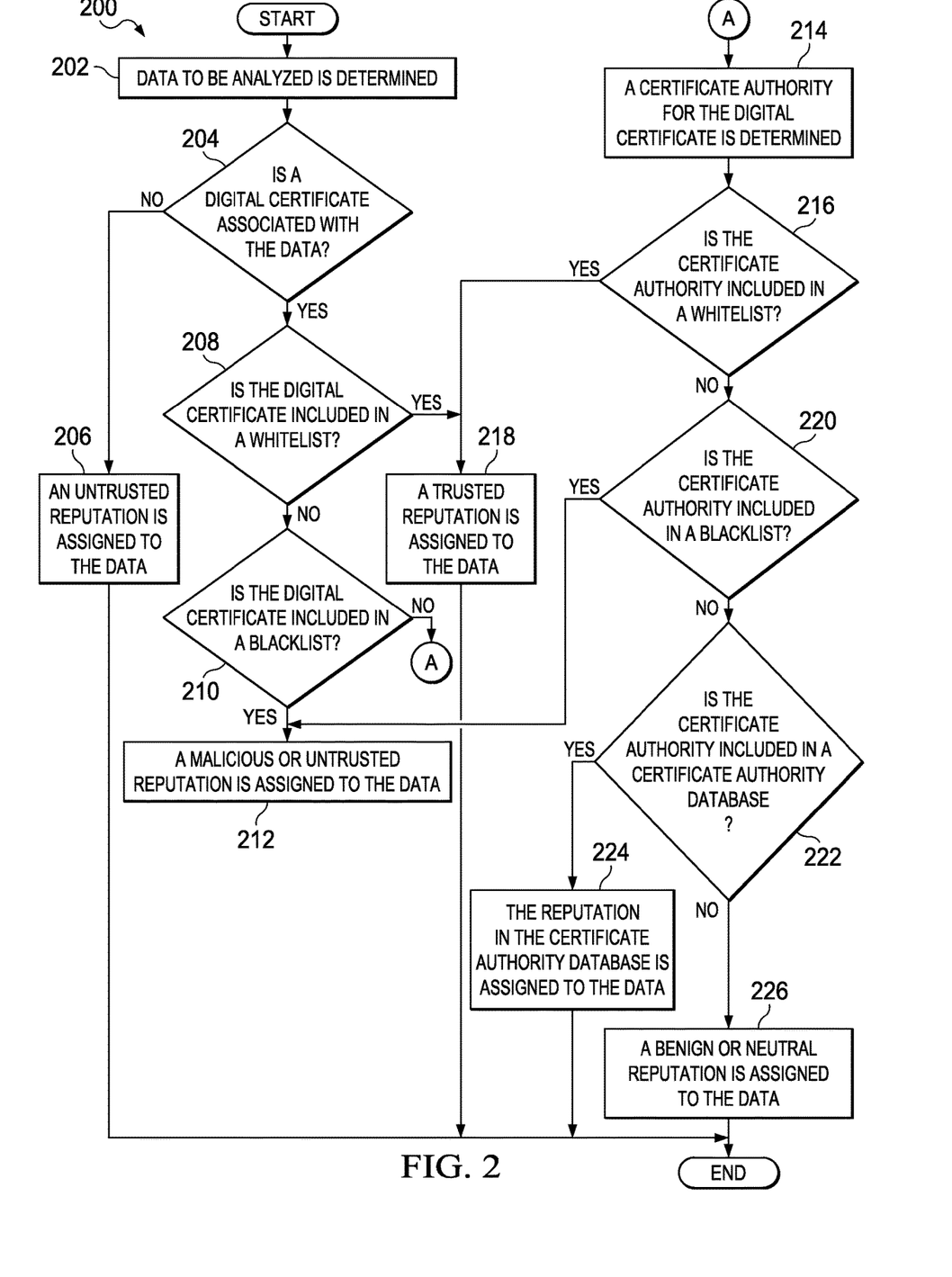
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with determining the reputation of a digital certificate, in accordance with an embodiment. In an embodiment, one or more operations of flow 200 may be performed by digital certificate reputation module 112 and network digital certificate reputation modules 126a and 126b. At 202, data to be analyzed is determined. At 204, the system determines if a digital certificate is associated with the data. If a digital certificate is not associated with the data, then an untrusted reputation is assigned to the data, as in 206. If a digital certificate is associated with the data, then the system determines if the digital certificate is included in a whitelist, as in 208. If the digital certificate is included in a whitelist, then a trusted reputation is assigned to the data, as in 218. If the digital certificate is not included in a whitelist, then the system determines if the digital certificate is included in a blacklist, as in 210. If the digital certificate is included in a blacklist, then a malicious or untrusted reputation is assigned to the data, as in 212. If the digital certificate is not included in a blacklist, then a certificate authority for the digital certificate is determined, as in 214. At 216, the system determines if the certificate authority is included in a whitelist. If the certificate authority is included in a whitelist, then a trusted reputation is assigned to the data, as in 218. If the certificate authority is not included in a whitelist, then the system determines if the certificate authority is included in a blacklist, as in 220. If the certificate authority is included in a blacklist, then a malicious or untrusted reputation is assigned to the data, as in 212. If the certificate authority is not included in a blacklist, then the system determines if the certificate authority is included in a certificate authority database, as in 222. If the certificate authority is not included in a certificate authority database, then a benign or neutral reputation is assigned to the data, as in 226. If the certificate authority is included in a certificate authority database, then the reputation in the certificate authority database is assigned to the data, as in 224.

Figure 3:
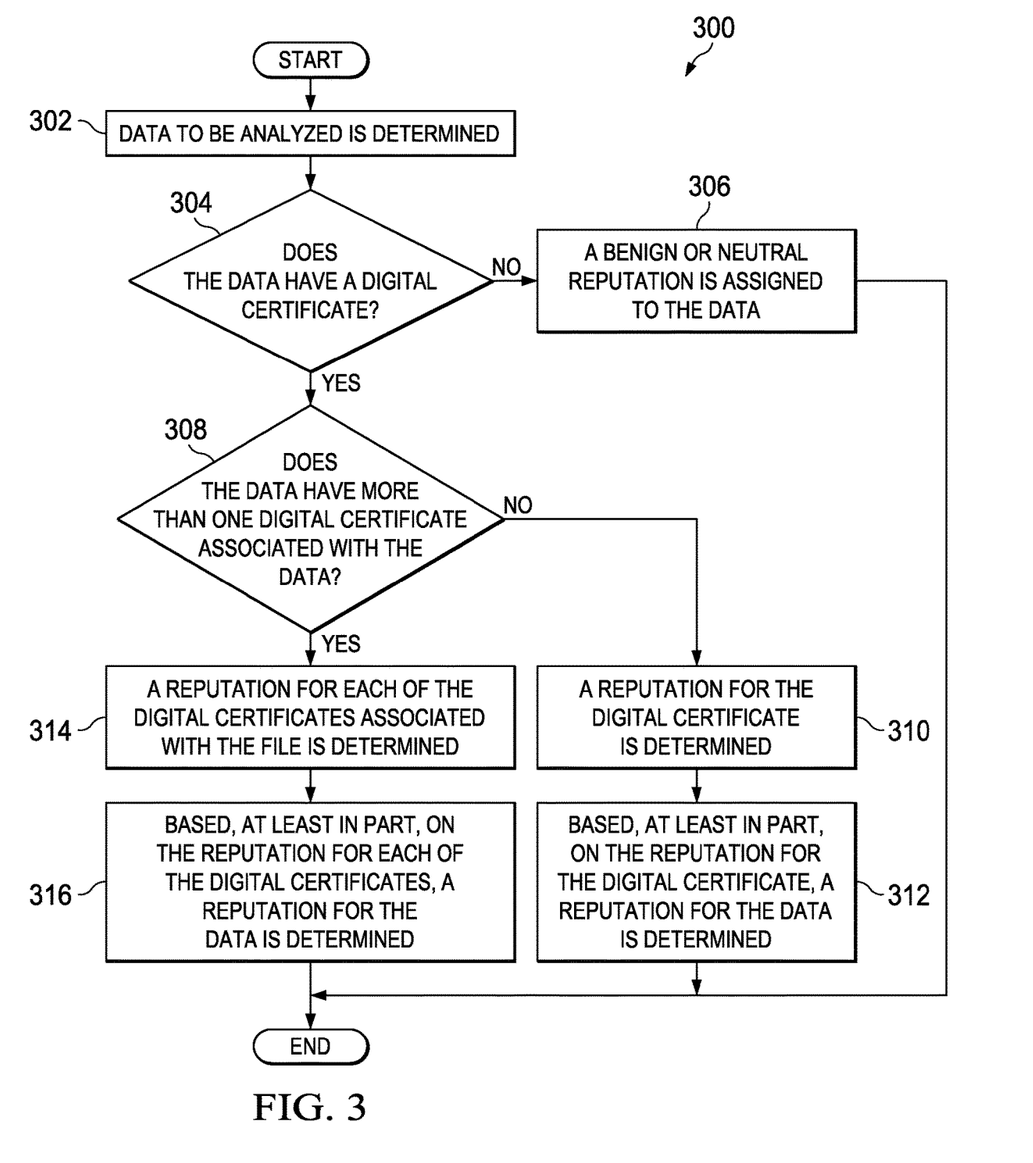
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with determining the reputation of a digital certificate, in accordance with an embodiment. In an embodiment, one or more operations of flow 300 may be performed by digital certificate reputation module 112 and network digital certificate reputation modules 126a and 126b. At 302, data to be analyzed is determined. At 304, the system determines if the data has a digital certificate. If the data does not have a digital certificate, then a benign or neutral reputation is assigned to the data, as in 306. In another example, if the data does not have a digital certificate, then an untrusted reputation is assigned to the data. If the data does have a digital certificate, then the system determines if the data has more than one digital certificate associated with the data. If the data does not have more than one digital certificate associated with the data, then a reputation for the digital certificate is determined, as in 310. At 312, based, at least in part, on the reputation for the digital certificate, a reputation for the data is determined. Going back to 308, if the data has more than one digital certificate associated with the data, then a reputation for each of the digital certificates associated with the data is determined, as in 314. At 318, based, at least in part, on the reputation for each of the digital certificates, a reputation for the data is determined.

Figure 4:
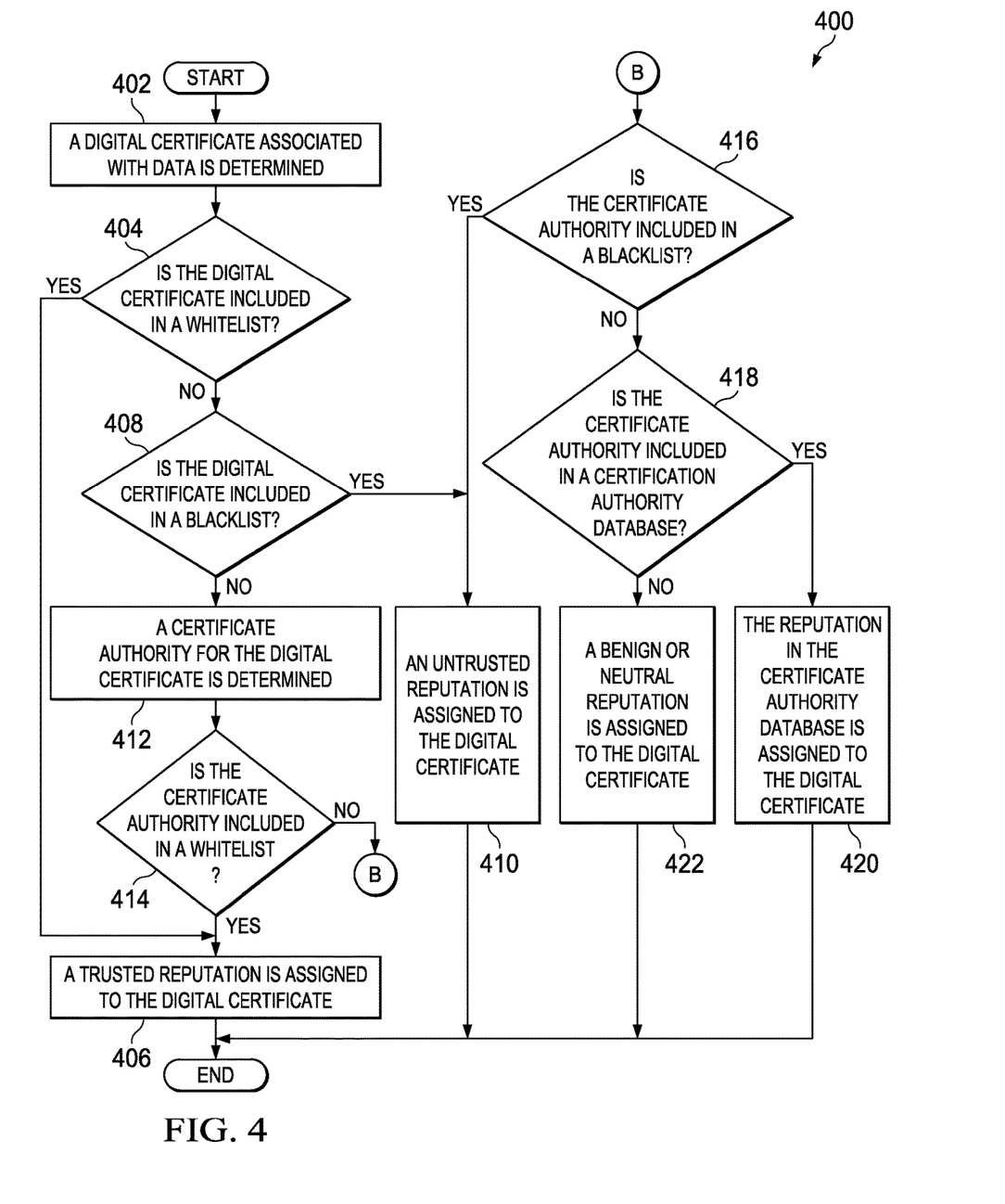
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with determining the reputation of a digital certificate, in accordance with an embodiment. In an embodiment, one or more operations of flow 400 may be performed by digital certificate reputation module 112 and network digital certificate reputation modules 126a and 126b. At 402, a digital certificate associated with data is determined. At 404, the system determines if the digital certificate is included in a whitelist. If the digital certificate is included in a whitelist, then a trusted reputation is assigned to the digital certificate, as in 406. If the digital certificate is not included in a whitelist, then the system determines if the digital certificate is included in a blacklist, as in 408 If the digital certificate is included in the blacklist, then an untrusted reputation is assigned to the digital certificate, as in 410. If the digital certificate is not included in the blacklist, then a certificate authority for the digital certificate is determined, as in 412. At 414, the system determines if the certificate authority is included in a whitelist. If the certificate authority is included in a whitelist, then a trusted reputation is assigned to the digital certificate, as in 406. If the certificate authority is not included in a whitelist, then the system determines if the certificate authority is included in a blacklist, as in 416. If the certificate authority is included in the blacklist, then an untrusted reputation is assigned to the digital certificate, as in 410. If the certificate authority is not included in the blacklist, then the system determines if the certificate authority is included in a certificate authority database, as in 418. If the certificate authority is not in the certificate authority database, then a benign or neutral reputation is assigned to the digital certificate, as in 422. If the certificate authority is in the certificate authority database, then the reputation in the certificate authority database is assigned to the digital certificate, as in 420.

Figure 5:
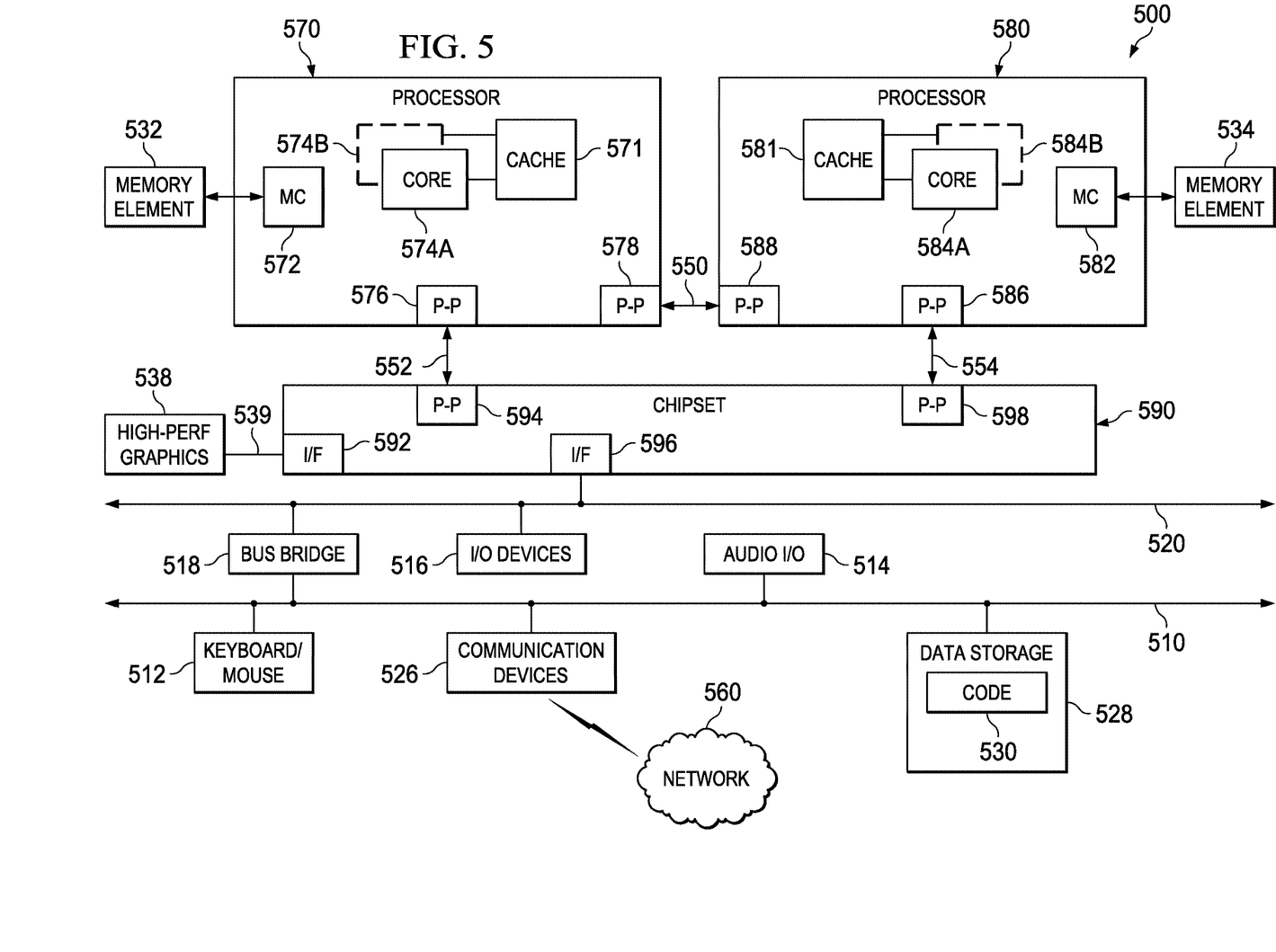
FIG. 5 is a block diagram illustrating an example computing system that is arranged in a point-to-point configuration in accordance with an embodiment.

FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 1-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor and may exchange data via a point-to-point (PtP) interface 550 using point-to-point interface circuits 578 and 588, respectively. Processors 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 6:
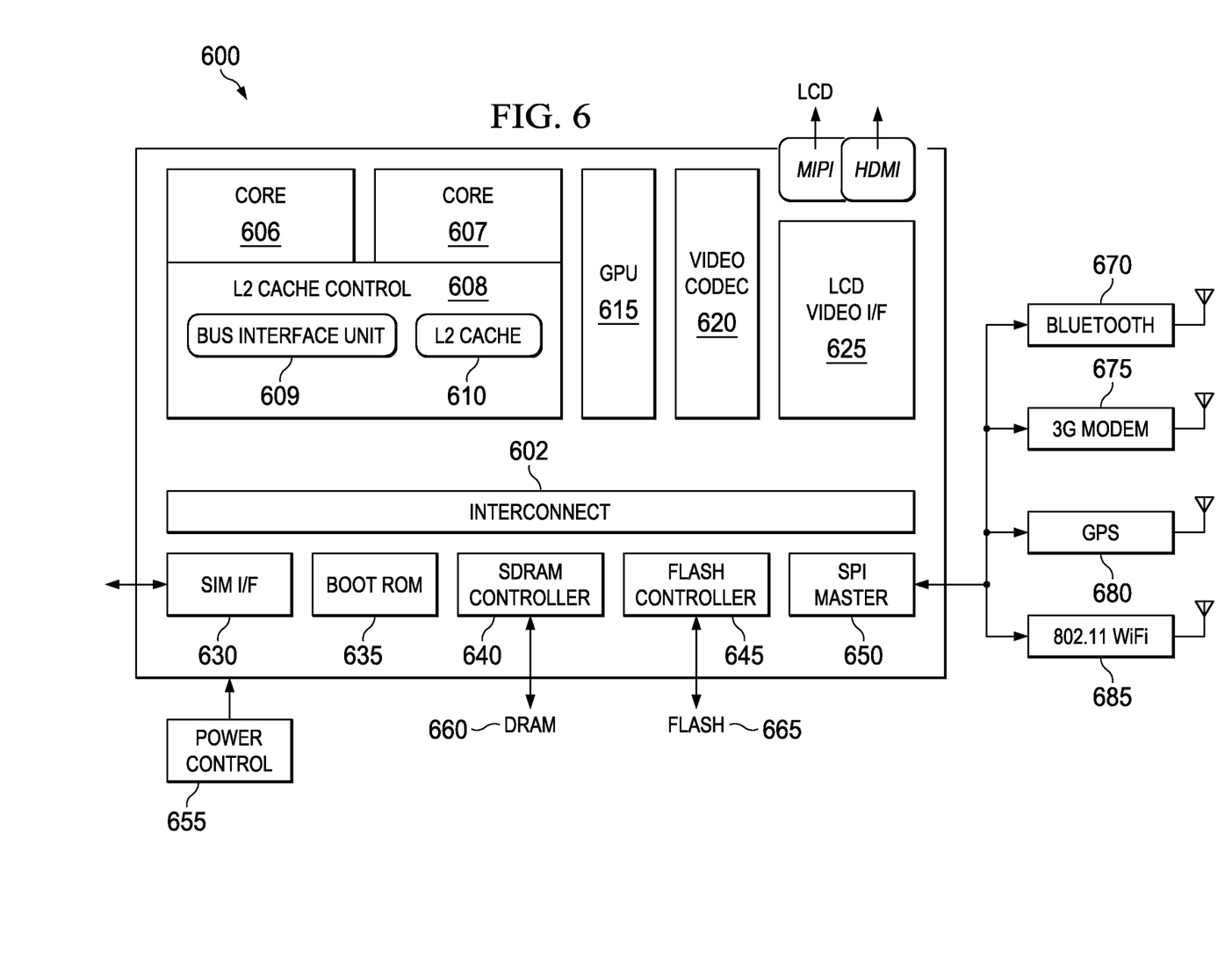
FIG. 6 is a simplified block diagram associated with an example ARM ecosystem system on chip (SOC) of the present disclosure.

Turning to FIG. 6, FIG. 6 is a simplified block diagram associated with an example ARM ecosystem SOC 600 of the present disclosure. At least one example implementation of the present disclosure can include the determining the reputation of a digital certificate features discussed herein and an ARM component. For example, the example of FIG. 6 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 6, ARM ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/ high-definition multimedia interface (HDMI) links that couple to an LCD.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more example embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
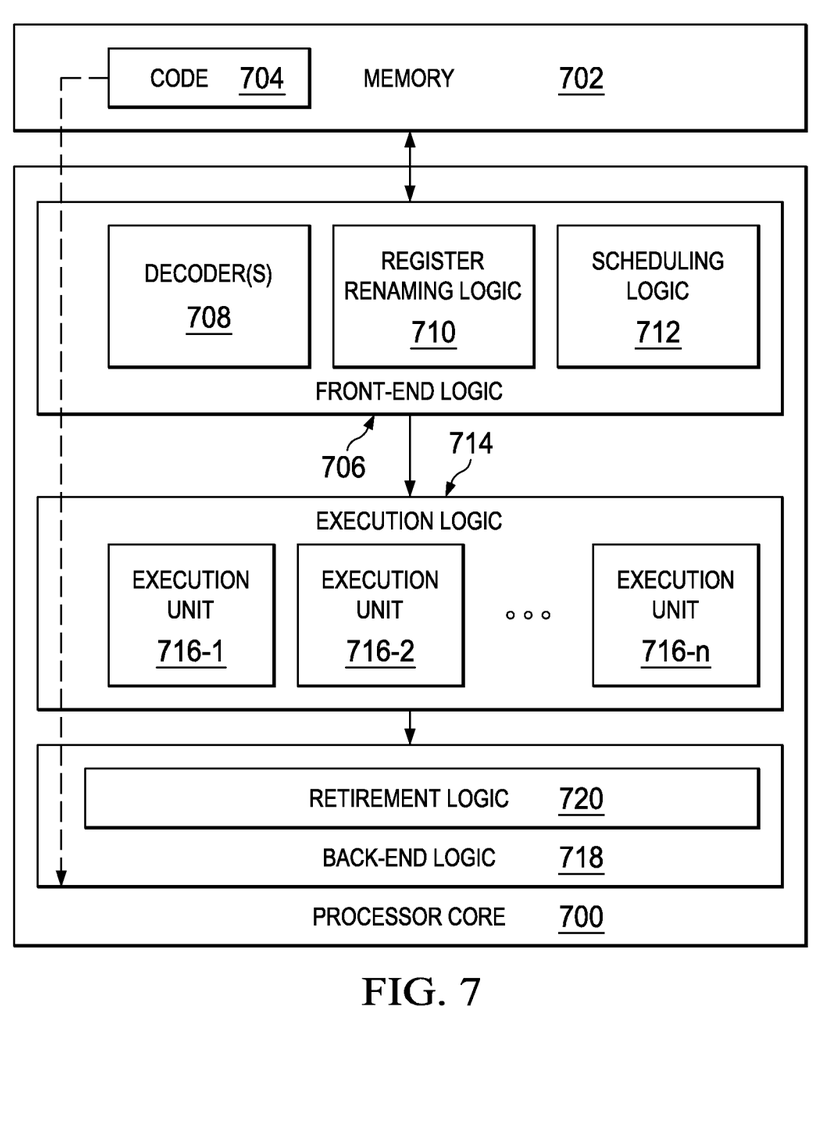
FIG. 7 is a block diagram illustrating an example processor core in accordance with an embodiment.

FIG. 7 illustrates a processor core 700 according to an embodiment. Processor core 700 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents one example embodiment of processors cores 574a, 574b, 574a, and 574b shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a and 100b and their teachings are readily scalable and can accommodate a large number of components, as well as more complicated/sophisticated arrangements and configurations. Accordingly, the examples provided should not limit the scope or inhibit the broad teachings of communication systems 100a and 100b as potentially applied to a myriad of other architectures.

It is also important to note that the operations in the preceding flow diagrams (i.e., FIGS. 2-4) illustrate only some of the possible correlating scenarios and patterns that may be executed by, or within, communication system 100a and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100*a* and 100*b* have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to identify a digital certificate associated with data and assign a reputation to the digital certificate, wherein the reputation includes an indication if the data is trusted or untrusted.

In Example C2, the subject matter of Example C1 can optionally include where the digital certificate is classified as trusted if the digital certificate is included in an entry in a whitelist.

In Example C3, the subject matter of any one of Examples C1-C2 can optionally include where the digital certificate is classified as untrusted if the digital certificate is included in an entry in a blacklist.

In Example C4, the subject matter of any one of Examples C1-C3 can optionally include where the one or more instructions that when executed by the at least one processor, further cause the processor to determine a certificate authority that created the digital certificate and assign the reputation to the digital certificate based at least in part on a reputation of the certificate authority.

In Example C5, the subject matter of any one of Examples C1-C4 can optionally include where the digital certificate is classified as trusted if the certificate authority is included in an entry in a whitelist.

In Example C6, the subject matter of any one of Example C1-C5 can optionally include where the digital certificate is classified as untrusted if the certificate authority is included in an entry in a blacklist.

In Example C7, the subject matter of any one of Examples C1-C6 can optionally include where the reputation of the certificate authority is determined using an entry in a certificate authority reputation database.

In Example C8, the subject matter of any one of Examples C1-C7 can optionally include where the one or more instructions that when executed by the at least one processor, further cause the processor to identify more than one digital certificate associated with the data, determine a reputation for each of the more than one digital certificates, and assign the reputation to the digital certificate, based on the reputation of each of the more than one digital certificates.

In Example A1, an electronic device can include a digital certificate reputation module, where the digital certificate reputation module is configured to identify a digital certificate associated with data and assign a reputation to the digital certificate, wherein the reputation includes an indication if the data is trusted or untrusted.

In Example, A2, the subject matter of Example A1 can optionally include where the digital certificate is classified as trusted if the digital certificate is included in an entry in a whitelist.

In Example A3, the subject matter of any one of Examples A1-A2 can optionally include where the digital certificate is classified as untrusted if the digital certificate is included in an entry in a blacklist.

In Example A4, the subject matter of any one of Examples A1-A3 can optionally include where the digital certificate reputation module is further configured to determine a certificate authority that created the digital certificate and assign the reputation to the digital certificate based at least in part on a reputation of the certificate authority.

In Example A5, the subject matter of any one of Examples A1-A4 can optionally include where the digital certificate is classified as trusted if the certificate authority is included in an entry in a whitelist.

In Example A6, the subject matter of any one of Examples A1-A5 can optionally include where the digital certificate is classified as untrusted if the certificate authority is included in an entry in a blacklist.

In Example A7, the subject matter of any one of Examples A1-A6 can optionally include where the reputation of the certificate authority is determined using an entry in a certificate authority reputation database.

In Example A8, the subject matter of any one of Examples A1-A7 can optionally include where the digital certificate reputation module is further configured to identify more than one digital certificate associated with the data, determine a reputation for each of the more than one digital certificates, and assign the reputation to the digital certificate, based on the reputation of each of the more than one digital certificates.

Example M1 is a method including identifying a digital certificate associated with data and assigning a reputation to the digital certificate, wherein the reputation includes an indication if the data is trusted or untrusted.

In Example M2, the subject matter of Example M1 can optionally include where the digital certificate is classified as trusted if the digital certificate is included in an entry in a whitelist.

In Example M3, the subject matter of any one of the Examples M1-M2 can optionally include where the digital certificate is classified as untrusted if the digital certificate is included in an entry in a blacklist.

In Example M4, the subject matter of any one of the Examples M1-M3 can optionally include determining a certificate authority that created the digital certificate and assigning the reputation to the digital certificate based at least in part on a reputation of the certificate authority.

In Example M5, the subject matter of any one of the Examples M1-M4 can optionally include where the digital certificate is classified as trusted if the certificate authority is included in an entry in a whitelist.

In Example M6, the subject matter of any one of the Examples M1-M5 can optionally include where the digital certificate is classified as untrusted if the certificate authority is included in an entry in a blacklist.

In Example M7, the subject matter of any one of the Examples M1-M6 can optionally include identifying more than one digital certificate associated with the data, determining a reputation for each of the more than one digital certificates, and assigning the reputation to the digital certificate, based on the reputation of each of the more than one digital certificates.

Example S1 is a system for determining the reputation of a digital certificate, the system including a digital certificate reputation module configured for identifying a digital certificate associated with data and assigning a reputation to the digital certificate, wherein the digital certificate is classified as trusted if the digital certificate is included in an entry in a whitelist and the digital certificate is classified as untrusted if the digital certificate is included in an entry in a blacklist.

In Example S2, the subject matter of Example S1 can optionally include where the system is further configured for determining a certificate authority that created the digital certificate and assigning the reputation to the digital certificate based at least in part on a reputation of the certificate authority.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory, computer-readable medium comprising one or more instructions that, when executed by at least one processor, cause the at least one processor to perform a method comprising:
    identifying a digital certificate associated with data;
    classifying the digital certificate as trusted if the digital certificate is included in an entry in a certificate whitelist, or classifying the digital certificate as untrusted if the digital certificate is included in an entry in a certificate blacklist;
    determining a certificate authority that created the digital certificate;
    determining a reputation of the certificate authority based on a determination that the digital certificate is not included in the certificate whitelist or the certificate blacklist; and
    assigning a reputation to the data based at least in part on the reputation of the certificate authority, wherein the data is classified as trusted if the certificate authority is included in an entry in an authority whitelist or the data is classified as untrusted if the certificate authority is included in an entry in an authority blacklist.

2. The at least one non-transitory, computer-readable medium of claim 1, wherein the digital certificate is classified as trusted if the certificate authority is included in the entry in the authority whitelist.

3. The at least one non-transitory, computer-readable medium of claim 1, wherein the digital certificate is classified as untrusted if the certificate authority is included in the entry in the authority blacklist.

4. The at least one non-transitory, computer-readable medium of claim 1, wherein the reputation of the certificate authority is determined using an entry in a certificate authority reputation database.

5. The at least one non-transitory, computer-readable medium of claim 1, the method further comprising:
    identifying more than one digital certificates associated with the data;
    determining a reputation for each of the more than one digital certificates; and
    assigning the reputation to the digital certificate, based on the reputation of each of the more than one digital certificates.

6. The at least one non-transitory, computer-readable medium of claim 1, wherein the reputation of the certificate authority is determined based at least in part on a file prevalence of the certificate authority.

7. An apparatus, comprising:
    a memory; and
    a processor configured to
        identify a digital certificate associated with data;
        classify the digital certificate as trusted if the digital certificate is included in an entry in a certificate whitelist, or classify the digital certificate as untrusted if the digital certificate is included in an entry in a certificate blacklist;
        determine a certificate authority that created the digital certificate;
        determine a reputation of the certificate authority based on a determination that the digital certificate is not included in the certificate whitelist or the certificate blacklist; and
        assign a reputation to the data based at least in part on the reputation of the certificate authority, wherein the data is classified as trusted if the certificate authority is included in an entry in an authority whitelist or the data is classified as untrusted if the certificate authority is included in an entry in an authority blacklist.

8. The apparatus of claim 7, wherein the digital certificate is classified as trusted if the certificate authority is included in the entry in the authority whitelist.

9. The apparatus of claim 7, wherein the digital certificate is classified as untrusted if the certificate authority is included in the entry in the authority blacklist.

10. The apparatus of claim 7, wherein the reputation of the certificate authority is determined using an entry in a certificate authority reputation database.

11. The apparatus of claim 7, wherein the processor is further configured to:
    identify more than one digital certificates associated with the data;
    determine a reputation for each of the more than one digital certificates; and
    assign the reputation to the digital certificate, based on the reputation of each of the more than one digital certificates.

12. The apparatus of claim 7, wherein the reputation of the certificate authority is determined based at least in part on a file prevalence of the certificate authority.

13. A method, comprising:
    identifying a digital certificate associated with data;
    classifying the digital certificate as trusted if the digital certificate is included in an entry in a certificate whitelist, or classifying the digital certificate as untrusted if the digital certificate is included in an entry in a certificate blacklist;

determining a certificate authority that created the digital certificate;

determining a reputation of the certificate authority based on a determination that the digital certificate is not included in the certificate whitelist or the certificate blacklist; and assigning a reputation to the data based at least in part on the reputation of the certificate authority, wherein the data is classified as trusted if the certificate authority is included in an entry in an authority whitelist or the data is classified as untrusted if the certificate authority is included in an entry in an authority blacklist.

14. The method of claim 13, wherein the digital certificate is classified as trusted if the certificate authority is included in the entry in the authority whitelist.

15. The method of claim 13, wherein the digital certificate is classified as untrusted if the certificate authority is included in the entry in the authority blacklist.

16. The method of claim 13, further comprising:
identifying more than one digital certificates associated with the data;

determining a reputation for each of the more than one digital certificates; and assigning the reputation to the digital certificate, based on the reputation of each of the more than one digital certificates.

17. A system for determining a reputation of a digital certificate, the system comprising:
a memory; and
a processor configured for
identifying the digital certificate, which is associated with data;

classifying the digital certificate as trusted if the digital certificate is included in an entry in a certificate whitelist, or classifying the digital certificate as untrusted if the digital certificate is included in an entry in a certificate blacklist;

determining a certificate authority that created the digital certificate;

determining a reputation of the certificate authority based on a determination that the digital certificate is not included in the certificate whitelist or the certificate blacklist; and assigning the reputation to the data based at least in part on the reputation of the certificate authority, wherein the data is classified as trusted if the certificate authority is included in an entry in an authority whitelist or the data is classified as untrusted if the certificate authority is included in an entry in an authority blacklist.

18. The system of claim 17, wherein the digital certificate is classified as trusted if the digital certificate is included in the entry in the certificate whitelist, and the digital certificate is classified as untrusted if the digital certificate is included in the entry in the certificate blacklist.

19. The method of claim 13, wherein the reputation of the certificate authority is determined based at least in part on a file prevalence of the certificate authority.

* * * * *